(12) United States Patent
Chung et al.

(10) Patent No.: US 9,202,604 B2
(45) Date of Patent: Dec. 1, 2015

(54) CATHODE ACTIVE MATERIAL FOR LITHIUM ION SECONDARY BATTERY INCLUDING LITHIUM MANGANESE BORATE COMPOUND AND MANGANESE OXIDE, AND METHOD FOR PRODUCING THE SAME

(71) Applicant: KOREA INSTITUTE OF SCIENCE AND TECHNOLOGY, Seoul (KR)

(72) Inventors: Kyung Yoon Chung, Seoul (KR); Ji Ung Kim, Seoul (KR); Ji-Young Kim, Seoul (KR); Byung Won Cho, Seoul (KR); Won Young Chang, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 176 days.

(21) Appl. No.: 14/037,860

(22) Filed: Sep. 26, 2013

(65) Prior Publication Data

US 2014/0361216 A1 Dec. 11, 2014

(30) Foreign Application Priority Data

Jun. 5, 2013 (KR) ......................... 10-2013-0064737

(51) Int. Cl.
| | |
|---|---|
| *H01B 1/08* | (2006.01) |
| *H01M 4/505* | (2010.01) |
| *C01B 35/00* | (2006.01) |
| *H01M 4/36* | (2006.01) |
| *C01B 35/12* | (2006.01) |
| *H01M 4/58* | (2010.01) |

(52) U.S. Cl.
CPC ................ *H01B 1/08* (2013.01); *C01B 35/128* (2013.01); *H01M 4/364* (2013.01); *H01M 4/505* (2013.01); *H01M 4/5825* (2013.01)

(58) Field of Classification Search
CPC ............ H01B 1/08; H01M 4/06; H01M 4/13; H01M 4/14; H01M 4/24; H01M 4/36; H01M 4/624; C01B 35/128; C01G 45/12
See application file for complete search history.

(56) References Cited

U.S. PATENT DOCUMENTS 5,578,395 A * 11/1996 Yoshimura et al. ............ 429/331
6,413,673 B1 * 7/2002 Kasai et al. ............... 429/231.95

FOREIGN PATENT DOCUMENTS

| EP | 2375478 | * 10/2011 |
| WO | WO 2011140327 A2 | * 11/2011 |

OTHER PUBLICATIONS

Kim et al "Synthesis and electrochemical properties of monoclinic LiMnBO3 and a Li intercalation material", Journal of the Electrochem. Soc., 158 (3) A309-315 (2011).*

\* cited by examiner

*Primary Examiner* — Mark Kopec
(74) *Attorney, Agent, or Firm* — Ladas & Parry LLP

(57) ABSTRACT

Disclosed is a cathode active material for a lithium ion secondary battery which includes a lithium manganese borate compound and a manganese oxide. The lithium manganese borate compound contains a larger amount of lithium than conventional lithium manganese borate compounds. Therefore, a larger amount of lithium is deintercalated in a battery including the cathode active material, and as a result, the specific capacity of the battery reaches 100-160 mAh/g, which is much higher than that of conventional lithium ion secondary batteries (<80 mAh/g). Also disclosed is a method for producing the cathode active material.

20 Claims, 4 Drawing Sheets

CATHODE ACTIVE MATERIAL FOR LITHIUM ION SECONDARY BATTERY INCLUDING LITHIUM MANGANESE BORATE COMPOUND AND MANGANESE OXIDE, AND METHOD FOR PRODUCING THE SAME

CROSS-REFERENCE TO RELATED APPLICATIONS

This application claims priority under 35 U.S.C. §119 to Korean Patent Application No. 10-2013-0064737 filed on Jun. 5, 2013 in the Korean Intellectual Property Office, the disclosure of which is incorporated herein by reference in its entirety.

BACKGROUND OF THE INVENTION

1. Field of the Invention

The present invention relates to a cathode active material for a lithium ion secondary battery which includes a lithium manganese borate compound and a manganese oxide. The present invention also relates to a method for producing the cathode active material.

2. Description of the Related Art

In recent years, olivine phosphates $LiMPO_4$ (M=Fe, Mn, Co, etc.) have been used as electrode active materials. The olivine phosphates are known to undergo less reduction in capacity even after a number of cycles due to their high stability. However, the olivine phosphates have theoretical capacities insufficient to meet applications where high capacity secondary batteries are needed.

Lithium borates $LiMBO_3$ (M=Fe, Mn, Co, etc.) have been proposed as alternatives to olivine phosphates. The borate-based materials have received great attention as substitutes for lithium phosphates including $(PO_4)^{3-}$ due to the presence of the triangle oxyanion $(BO_3)^{3-}$, which is lighter than other anions. For this reason, the borate-based materials are known to have higher theoretical capacities (approx. 220 mAh/g) than the phosphate-based materials. It is also known that the borate-based materials have the ability to increase the volume energy density of batteries due to their similar density to lithium phosphate. According to previous reports, however, resistances structurally occurring in batteries impede sufficient utilization of high theoretical capacities inherent to borate-based materials and permit only specific capacities as low as 80 mAh/g.

On the other hand, the use of manganese-containing compounds as cathode materials was proposed based on the fact that manganese (Mn) of $LiMnBO_3$ generally has a higher oxidation-reduction potential than iron (Fe). From a theoretical point of view, the Mn-containing compound $LiMnBO_3$ is known as a cathode material whose operating voltage is higher than that of the Fe-containing compound $LiFeBO_3$. However, Mn-based borate materials suffer from limitations, such as lower capacity than $LiFeBO_3$, owing to their inherent low electrical conductivity and ionic conductivity.

SUMMARY OF THE INVENTION

The present invention provides has been made in an effort to solve the problems (such as low theoretical capacity) of conventional cathode active materials, and it is an object of the present invention to provide a cathode active material for a lithium ion secondary battery including a lithium manganese borate compound and a manganese oxide. It is another object of the present invention to provide a method for producing the cathode active material.

One aspect of the present invention provides a cathode active material for a lithium ion secondary battery including a lithium manganese borate compound and a manganese oxide wherein the lithium manganese borate compound has a structure represented by Formula 1:

$$Li_{1+x}MnBO_3 \quad (1)$$

wherein x is a real number from 0 to 1.

Another aspect of the present invention provides a method for producing the cathode active material.

According to embodiments of the present invention, the lithium manganese borate compound of Formula 1 as the cathode active material of the present invention contains a larger amount of lithium than conventional lithium manganese borate compounds. Therefore, a larger amount of lithium is deintercalated in a battery including the cathode active material, and as a result, the specific capacity of the battery reaches 100-160 mAh/g, which is much higher than that of conventional lithium ion secondary batteries (<80 mAh/g).

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
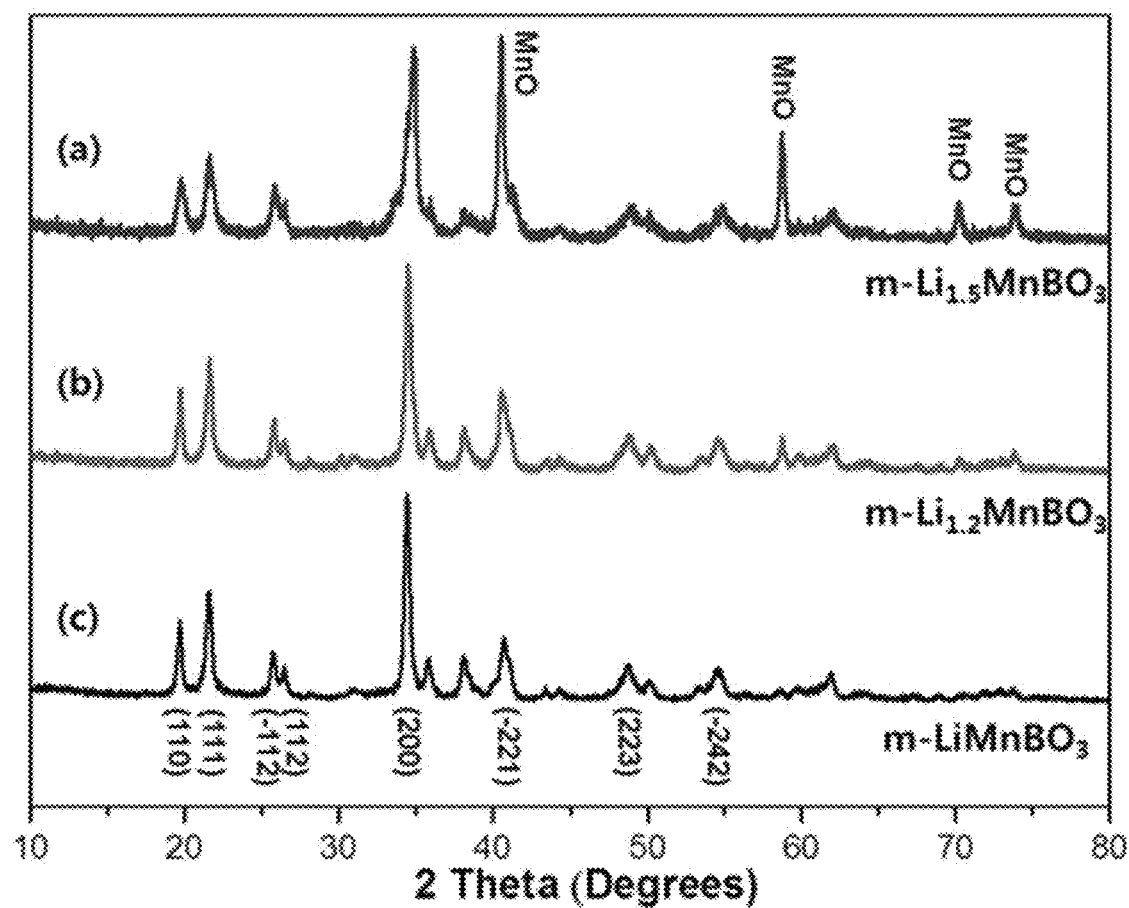
FIG. 1 shows X-ray diffraction patterns of lithium manganese borate compounds according to exemplary embodiments of the present invention.

Aspects and embodiments of the present invention will now be described in more detail.

In one aspect of the present invention, a cathode active material for a lithium ion secondary battery includes a lithium manganese borate compound and a manganese oxide wherein the lithium manganese borate compound has a structure represented by Formula 1:

$$Li_{1+x}MnBO_3 \quad (1)$$

wherein x is a real number from 0 to 1.

Since the borate compound of Formula 1 as the cathode active material contains an excess of lithium, a larger amount of lithium is deintercalated in a battery including the cathode active material, and as a result, the specific capacity of the battery reaches 100-160 mAh/g, which is much higher than that of conventional lithium ion secondary batteries (<80 mAh/g). Therefore, the cathode active material of the present invention can replace $LiMnBO_3$ whose electrochemical properties are not sufficient.

The cathode active material of the present invention may be a simple mixture of the lithium manganese borate compound of Formula 1 and a manganese oxide but is preferably a composite formed through an interaction between the two materials.

The term "manganese oxide" used herein is intended to include not only materials composed of manganese (Mn) and oxygen (O) but also materials further containing lithium (Li) in addition to Mn and O.

In one embodiment of the present invention, the lithium manganese borate compound has a monoclinic structure, and the ratio of the peak for the crystal plane (200) of the lithium manganese borate compound to the peak for the crystal plane (−221) of the manganese oxide is 1:0.3-1.5, as determined by X-ray diffraction analysis of the cathode active material.

In another aspect of the present invention, a method for producing a cathode active material for a lithium ion secondary battery includes:

(a) mixing and grinding a lithium compound, a manganese compound, boron compound, and a carbon compound using a ball mill; and (b) annealing the mixture, wherein the cathode active material includes a lithium manganese borate compound and a manganese oxide, the lithium manganese borate compound has a structure represented by Formula 1:

$$Li_{1+x}MnBO_3 \qquad (1)$$

wherein x is a real number from 0 to 1, the lithium manganese borate compound has a monoclinic structure, and the ratio of the peak for the crystal plane (200) of the lithium manganese borate compound to the peak for the crystal plane (−221) of the manganese oxide is 1:0.3-1.5, as determined by X-ray diffraction analysis of the cathode active material.

Numerous studies have been conducted to improve the characteristics of lithium manganese borate compounds. Most of the studies are based on coating with conductive materials and various synthesis methods for improving the electrical conductivity of cathode active materials. According to other previous studies, the electrochemical properties of electrode materials are improved by reducing the particle size of the materials to shorten the migration path of lithium. In contrast, according to the embodiment of the present invention, the electrode active material is produced by changing the stoichiometric ratio between the constituent elements such that the electrode active material contains an excess of lithium with respect to the stoichiometric ratio.

In an embodiment of the present invention, the ball mill is a planetary ball mill; the lithium compound is selected from $Li_2CO_3$, $LiOH.H_2O$, $LiNO_3$, $LiBO_2$, and mixtures thereof; the manganese compound is selected from $MnC_2O_4.2H_2O$, $MnNO_3.(H_2O)_4$, $MnCO_3$, $MnO_2$, and mixtures thereof; the boron compound is selected from $B_2O_3$, $B(OEt)_4$, $H_3BO_3$, and mixtures thereof; and the carbon compound is selected from $C_{12}H_{22}O_{11}$, $C_6H_{10}O_4$, $C_8H_8O_7$, and mixtures thereof.

In a further embodiment of the present invention, step (a) is carried out by a dry process.

In one embodiment of the present invention, in step (a), the raw materials are mixed and ground in a planetary ball mill either by a wet process using a solvent or a dry process without using a solvent.

When step (a) is carried out by a dry process, the raw materials and a predetermined amount of beads are used without using a solvent. Preferably, the beads are uniform in size and are used in an amount of 10 to 30 times the total amount of the raw materials.

Alternatively, when step (a) is carried out by a wet process, at least one solvent selected from ethanol, methanol, and acetone may be used. The concentration of the solution including the raw materials may be appropriately controlled depending on the amount of the solvent added.

The dry process is carried out in a simpler manner than the wet process using a solvent. Therefore, the dry process has the advantages of low production cost, high production efficiency, and ease of mass production over the wet process.

In another embodiment of the present invention, in step (a), the raw materials are mixed and ground at a stirring rate of 100 to 300 rpm.

When the stirring rate is within the range defined above, a uniform particle size of the mixture can be ensured.

In a further embodiment of the present invention, step (b) is carried out at a temperature of 450 to 850° C.

In step (b), the mixture obtained in step (a) is annealed. The annealing allows the final compound to have uniform physical properties. Particularly, the structure of the lithium manganese borate compound is changed depending on the annealing temperature. This structural change greatly affects the electrochemical properties of the cathode active material.

If the annealing temperature is outside the range defined above, particularly lower than 450° C., a monoclinic structure, which is known to be advantageous in terms of electrochemical properties, is formed but long-term chemical stability may not be ensured. Meanwhile, if the annealing temperature exceeds 850° C., the lithium manganese borate compound forms a hexagonal structure, which is disadvantageous in terms of electrochemical properties.

In another embodiment of the present invention, step (b) is carried out for 5 to 20 hours.

The annealing time may be adjusted such that the product exhibits high crystallinity and excellent electrochemical properties.

The present invention will be explained in more detail with reference to the following examples, including comparative examples. However, these examples are not to be construed as limiting or restricting the scope and spirit of the invention. It is to be understood that based on the teachings of the present invention including the following examples, those skilled in the art can readily practice other embodiments of the present invention whose specific experimental data are not available.

Example 1

Production of $Li_{1.5}MnBO_3$ $MnC_2O_4.2H_2O$ as a divalent manganese compound, boron trioxide $B_2O_3$, and lithium carbonate $Li_2CO_3$ were introduced in a molar ratio of 1:1:1.5 into a planetary ball mill, and then sucrose $C_{12}H_{22}O_{11}$ was added in an amount of 10 wt % with respect to the weight of the final material. Sucrose serves to improve the conductivity of the active material. Thereafter, beads were introduced into the planetary ball mill. The beads were used in an amount of 20 times the weight of the mixture. The raw materials were mixed and ground at 250 rpm for 6 h. Then, the mixture was heated to 600° C. at a rate of 2° C./min, annealed for 15 h, and allowed to cool to room temperature at the same rate, affording $Li_{1.5}MnBO_3$.

Example 2

Production of $Li_{1.2}MnBO_3$ $Li_{1.2}MnBO_3$ was produced in the same manner as in Example 1, except that the molar ratio (1:1:1.5) of MnC$_2$O$_4$.2H$_2$O as the divalent manganese compound, boron trioxide B$_2$O$_3$, and lithium carbonate Li$_2$CO$_3$ was changed to 1:1:1.2.

Comparative Example 1

Production of Li$_{1.0}$MnBO$_3$

Li$_{1.0}$MnBO$_3$ was produced in the same manner as in Example 1, except that the molar ratio (1:1:1.5) of MnC$_2$O$_4$.2H$_2$O as the divalent manganese compound, boron trioxide B$_2$O$_3$, and lithium carbonate Li$_2$CO$_3$ was changed to 1:1:1.

Example 3

Fabrication of Lithium Ion Secondary Battery (1)

0.5 g of the lithium manganese borate compound produced in Example 1 as a cathode active material, 0.0625 g of Denka black, and 5% PVDF were dissolved in 1.25 g of NMP. To the solution was added NMP with stirring. The resulting slurry was cast on a thin aluminum plate and dried in a vacuum oven at 120° C. for 6 h to produce an electrode. The electrode, a PP separator, and lithium metal as an anode material were assembled to fabricate a coin type lithium ion secondary battery.

1 M solution of LiPF$_6$ in an ethylene carbonate/dimethyl carbonate mixture (1:1, v/v) was used as electrolyte.

The capacities of the coin type battery were measured during charge and discharge in the voltage range of 1.5-4.5 V. Changes in the capacity of the coin type battery were measured at different C-rates.

Example 4

Fabrication of lithium Ion Secondary Battery (2)

A coin type lithium ion secondary battery was fabricated in the same manner as in Example 3, except that Li$_{1.2}$MnBO$_3$ produced in Example 2 was used as a cathode active material instead of Li$_{1.5}$MnBO$_3$ produced in Example 1.

Comparative Example 2

Fabrication of Lithium Ion Secondary Battery (3)

A coin type lithium ion secondary battery was fabricated in the same manner as in Example 3, except that Li$_{1.0}$MnBO$_3$ produced in Comparative Example 1 was used as a cathode active material instead of Li$_{1.5}$MnBO$_3$ produced in Example 1.

Figure 2:
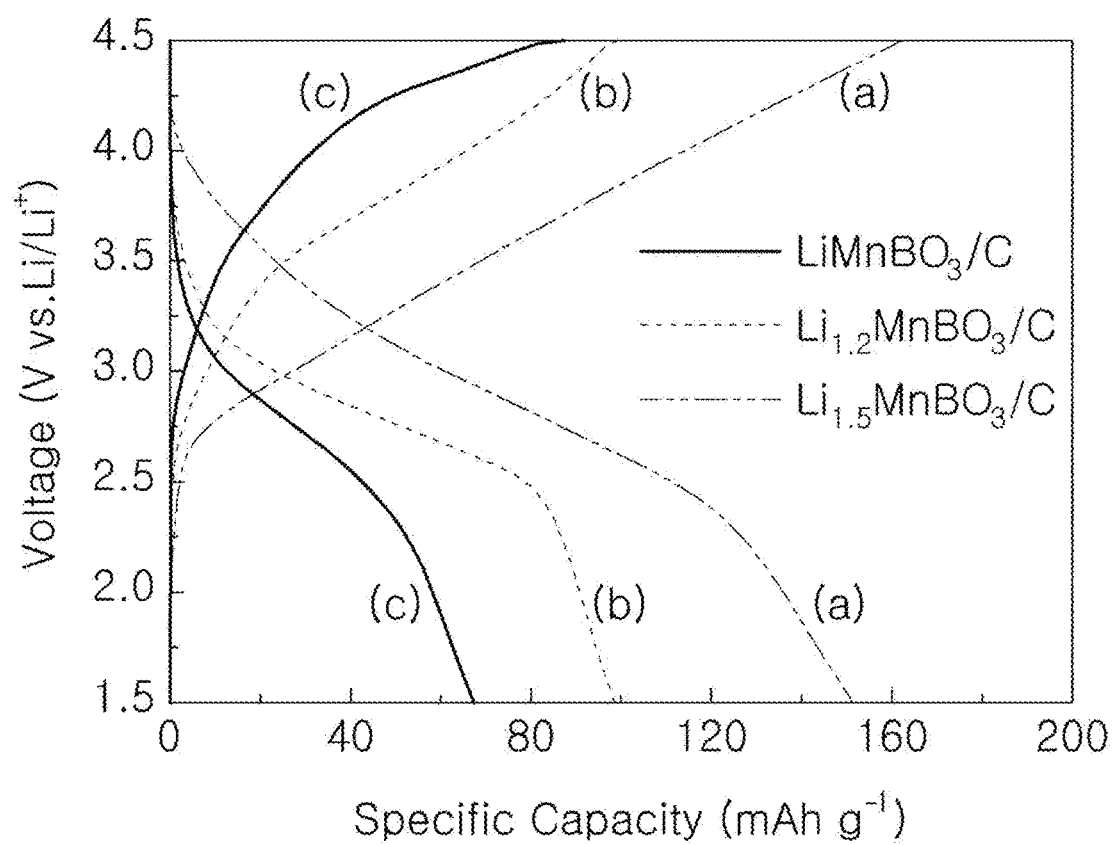
FIG. 2 shows charge-discharge curves of lithium ion secondary batteries including lithium manganese borate compounds as cathode materials according to exemplary embodiments of the present invention.
Figure 3:
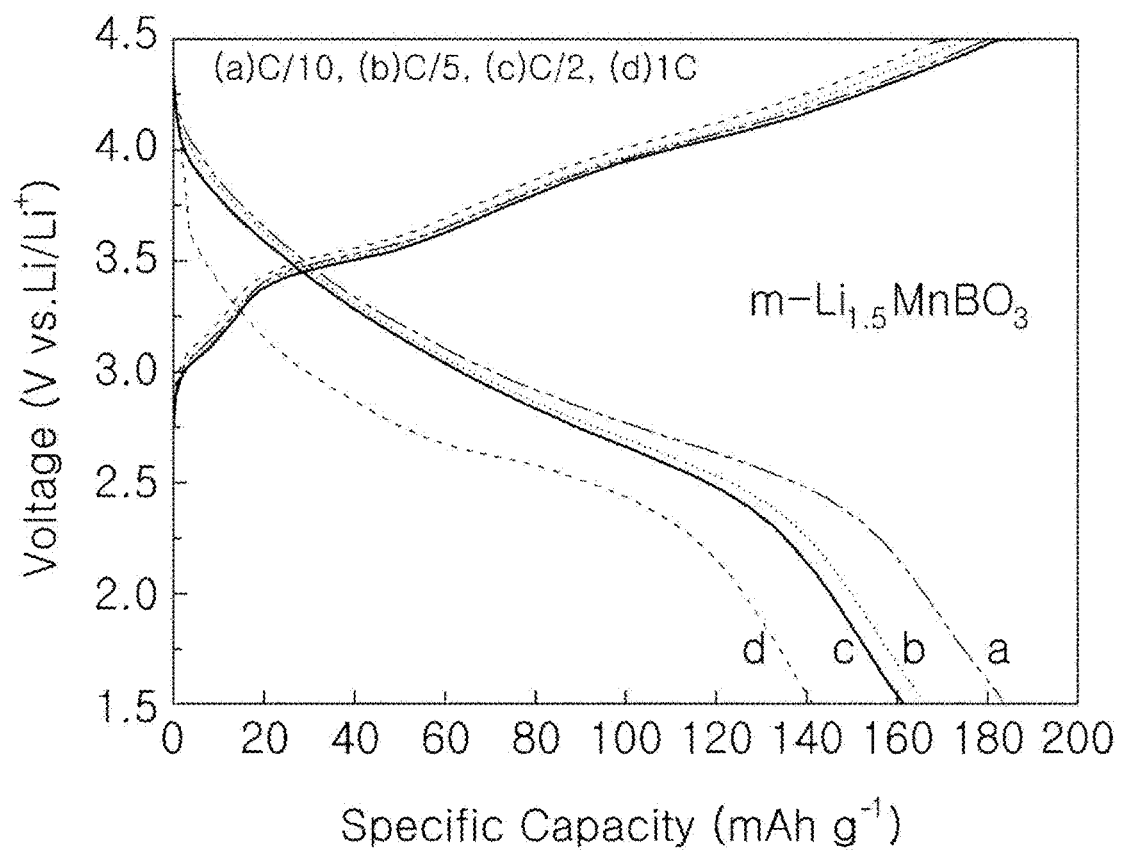
FIG. 3 shows charge-discharge curves of a lithium ion secondary battery including a lithium manganese borate compound as a cathode material according to an exemplary embodiment of the present invention at different C-rates.
Figure 4:
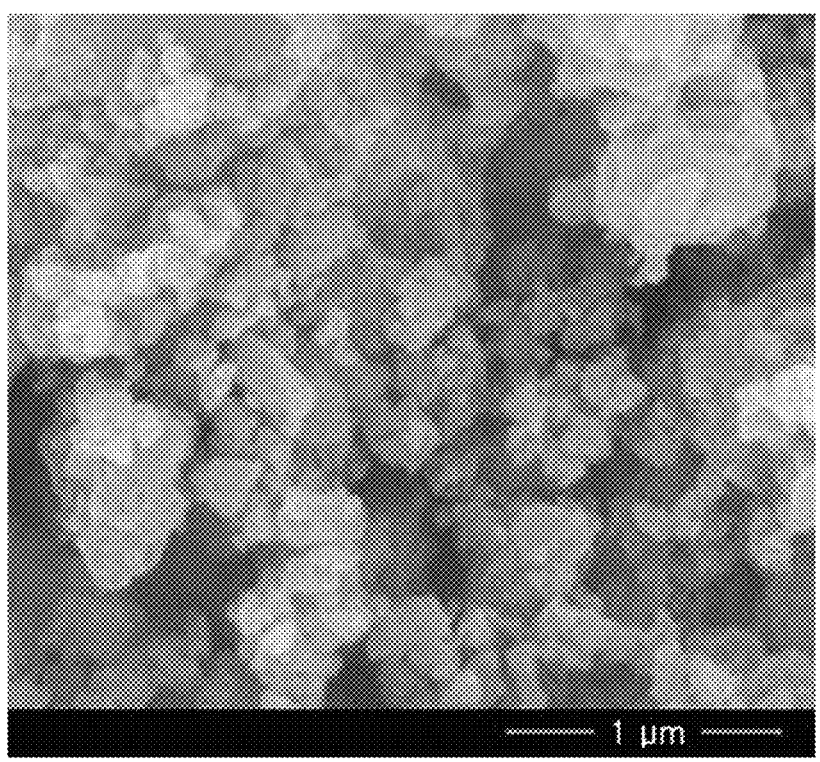
FIG. 4 is a SEM image of a lithium manganese borate compound according to an exemplary embodiment of the present invention.

As shown in FIGS. 2 and 3, the specific capacities of the lithium ion secondary batteries of Example 3 and 4 were 100-160 mAh/g, which are higher than the specific capacity of the lithium ion secondary battery of Comparative Example 2 (<80 mAh/g). These results are based on the fact that the excess lithium in the lithium manganese borate compounds of Examples 1 and 2 is further deintercalated in the batteries including the cathode active materials.

What is claimed is:

1. A cathode active material for a lithium ion secondary battery comprising a lithium manganese borate compound and a manganese oxide wherein the lithium manganese borate compound has a structure represented by Formula 1:

$$Li_{1+x}MnBO_3 \quad (1)$$

wherein x is a real number defined as 0<x<1.

2. The cathode active material according to claim 1, wherein the lithium manganese borate compound has a monoclinic structure, and the ratio of the peak for the crystal plane (200) of the lithium manganese borate compound to the peak for the crystal plane (−221) of the manganese oxide is 1:0.3-1.5, as determined by X-ray diffraction analysis of the cathode active material.

3. The cathode active material according to claim 1, wherein the lithium manganese borate compound comprises Li$_{1.2}$MnBO$_3$.

4. The cathode active material according to claim 1, wherein the lithium manganese borate compound comprises Li$_{1.5}$MnBO$_3$.

5. A method for producing a cathode active material for a lithium ion secondary battery, the method comprising:
(a) mixing and grinding a lithium compound, a manganese compound, boron compound, and a carbon compound using a ball mill; and
(b) annealing the mixture,
wherein the cathode active material comprises a lithium manganese borate compound and a manganese oxide,
the lithium manganese borate compound has a structure represented by Formula 1:

$$Li_{1+x}MnBO_3 \quad (1)$$

wherein x is a real number defined as 0<x<1,
the lithium manganese borate compound has a monoclinic structure, and
the ratio of the peak for the crystal plane (200) of the lithium manganese borate compound to the peak for the crystal plane (−221) of the manganese oxide is 1:0.3-1.5, as determined by X-ray diffraction analysis of the cathode active material.

6. The method according to claim 5, wherein the ball mill is a planetary ball mill; the lithium compound is selected from Li$_2$CO$_3$, LiOH.H$_2$O, LiNO$_3$, LiBO$_2$, and mixtures thereof; the manganese compound is selected from MnC$_2$O$_4$.2H$_2$O, MnNO$_3$.(H$_2$O)$_4$, MnCO$_3$, MnO$_2$, and mixtures thereof; the boron compound is selected from B$_2$O$_3$, B(OEt)$_4$, H$_3$BO$_3$, and mixtures thereof; and the carbon compound is selected from C$_{12}$H$_{22}$O$_{11}$, C$_6$H$_{13}$O$_4$, C$_8$H$_8$O$_7$, and mixtures thereof.

7. The method according to claim 5, wherein step (a) is carried out by a dry process.

8. The method according to claim 5, wherein, in step (a), the raw materials are mixed and ground at a stirring rate of 100 to 300 rpm.

9. The method according to claim 5, wherein step (b) is carried out at a temperature of 450 to 850° C.

10. The method according to claim 5, wherein, step (b) is carried out for 5 to 20 hours.

11. The method according to claim 5, wherein the lithium manganese borate compound is Li$_{1.2}$MnBO$_3$.

12. The method according to claim 5, wherein the lithium manganese borate compound is Li$_{1.5}$MnBO$_3$.

13. A method for producing a cathode active material, the method comprising:
mixing together a lithium compound, a manganese compound, a boron compound, and a carbon compound; and
annealing the mixture to produce the cathode active material that comprises a lithium manganese borate compound and a manganese oxide,
wherein the lithium manganese borate compound comprises a chemical formulation of Li$_{1+x}$MnBO$_3$ in which x is a real number defined as 0<x<1,
the lithium manganese borate compound has a monoclinic structure, and the ratio of the peak for the crystal plane (200) of the lithium manganese borate compound to the peak for the crystal plane (−221) of the manganese oxide is 1:0.3-1.5, as determined by X-ray diffraction analysis of the cathode active material.

14. The method according to claim 13, wherein the lithium compound is selected from the group consisting of $Li_2CO_3$, $LiOH \cdot H_2O$, $LiNO_3$, $LiBO_2$, and mixtures thereof;

the manganese compound is selected the group consisting of $MnC_2O_4 \cdot 2H_2O$, $MnNO_3 \cdot (H_2O)_4$, $MnCO_3$, $MnO_2$, and mixtures thereof;

the boron compound is selected the group consisting of $B_2O_3$, $B(OEt)_4$, $H_3BO_3$, and mixtures thereof; and the carbon compound is selected from $C_{12}H_{22}O_{11}$, $C_6H_{10}O_4$, $C_8H_8O_7$, and mixtures thereof.

15. The method according to claim 13, wherein mixing is carried out grinding together the lithium compound, the manganese compound, the boron compound, and the carbon compound within a planetary ball mill without using a solvent.

16. The method according to claim 15, wherein mixing comprises grinding the lithium compound, the manganese compound, the boron compound, and the carbon compound at a stirring rate of 100 to 300 rpm.

17. The method according to claim 13, wherein annealing is carried out at a temperature of 450 to 850° C.

18. The method according to claim 13, wherein, annealing is carried out for 5 to 20 hours.

19. The method according to claim 13, wherein mixing is carried out grinding together the lithium compound, the manganese compound, the boron compound, and the carbon compound within a planetary ball mill using a solvent.

20. The method according to claim 19, wherein mixing comprises grinding the lithium compound, the manganese compound, the boron compound, and the carbon compound at a stirring rate of 100 to 300 rpm.

\* \* \* \* \*